US007957589B2

(12) United States Patent
Anderson (10) Patent No.: US 7,957,589 B2
(45) Date of Patent: Jun. 7, 2011

(54) ARBITRARY POWER FUNCTION USING LOGARITHM LOOKUP TABLE

(75) Inventor: Michael H. Anderson, Leucadia, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 1080 days.

(21) Appl. No.: 11/698,609

(22) Filed: Jan. 25, 2007

(65) Prior Publication Data

US 2008/0180576 A1 Jul. 31, 2008

(51) Int. Cl.
*G06K 9/00* (2006.01)
*G03F 3/08* (2006.01)

(52) U.S. Cl. .......................................... 382/167; 358/518

(58) Field of Classification Search ........................ None
See application file for complete search history.

(56) References Cited

U.S. PATENT DOCUMENTS

| | | | |
|---|---|---|---|
| 4,709,995 A | 12/1987 | Kuribayashi et al. | |
| 4,954,789 A | 9/1990 | Sampsell | |
| 5,055,833 A | 10/1991 | Hehlen et al. | |
| 5,227,900 A | 7/1993 | Inaba et al. | |
| 5,255,093 A | 10/1993 | Topper et al. | |
| 5,285,196 A | 2/1994 | Gale | |
| 5,398,076 A * | 3/1995 | Lum et al. ..................... | 348/676 |
| 5,699,075 A | 12/1997 | Miyamoto | |
| 5,754,160 A | 5/1998 | Shimizu et al. | |
| 5,771,116 A | 6/1998 | Miller et al. | |
| 5,784,189 A | 7/1998 | Bozler et al. | |
| 5,828,367 A | 10/1998 | Kuga | |
| 5,912,758 A | 6/1999 | Knipe et al. | |
| 5,990,894 A | 11/1999 | Hu et al. | |
| 6,040,937 A | 3/2000 | Miles | |
| 6,128,638 A | 10/2000 | Thomas | |
| 6,178,435 B1 * | 1/2001 | Schmookler ................... | 708/277 |
| 6,182,100 B1 * | 1/2001 | Schmookler ................... | 708/277 |
| 6,327,071 B1 | 12/2001 | Kimura | |
| 6,356,254 B1 | 3/2002 | Kimura | |
| 6,507,330 B1 | 1/2003 | Handschy et al. | |
| 6,507,331 B1 | 1/2003 | Schlangen et al. | |
| 6,574,033 B1 | 6/2003 | Chui et al. | |

(Continued)

FOREIGN PATENT DOCUMENTS

EP 0 295 802 12/1988

(Continued)

OTHER PUBLICATIONS

Extended European Search Report dated Oct. 24, 2008 for App. No. 08153553.6.

(Continued)

*Primary Examiner* — Anand Bhatnagar
*Assistant Examiner* — Randolph Chu
(74) *Attorney, Agent, or Firm* — Knobbe Martens Olson & Bear LLP (57) ABSTRACT

A display device performs the fractional part of gamma translation by using a logarithm lookup table. The logarithm of an image data value is found in a look-up table. The retrieved result is multiplied by the fractional portion of the power, and a search in the look up table for this product produces an index related to the desired result. In another embodiment, rather than a search of the first look up table, a second inverse logarithm look up table is used to produce the desired result by looking up the exponentiation of the product.

19 Claims, 4 Drawing Sheets

U.S. PATENT DOCUMENTS

| | | |
|---|---|---|
| 6,593,934 B1 | 7/2003 | Liaw et al. |
| 6,636,187 B2 | 10/2003 | Tajima et al. |
| 6,674,562 B1 | 1/2004 | Miles et al. |
| 6,680,792 B2 | 1/2004 | Miles |
| 6,762,873 B1 | 7/2004 | Coker et al. |
| 6,862,029 B1 | 3/2005 | D'Souza et al. |
| 7,034,783 B2 | 4/2006 | Gates et al. |
| 7,123,216 B1 | 10/2006 | Miles |
| 7,161,728 B2 | 1/2007 | Sampsell et al. |
| 7,400,489 B2 | 7/2008 | Van Brocklin et al. |
| 7,499,208 B2 | 3/2009 | Mignard |
| 7,515,147 B2 | 4/2009 | Mignard |
| 2001/0026250 A1 | 10/2001 | Inoue et al. |
| 2001/0034075 A1 | 10/2001 | Onoya |
| 2001/0040536 A1 | 11/2001 | Tajima et al. |
| 2001/0052887 A1 | 12/2001 | Tsutsui et al. |
| 2002/0012159 A1 | 1/2002 | Tew |
| 2002/0024711 A1 | 2/2002 | Miles |
| 2002/0063666 A1* | 5/2002 | Kang et al. .............. 345/87 |
| 2002/0093722 A1 | 7/2002 | Chan et al. |
| 2003/0020699 A1 | 1/2003 | Nakatani et al. |
| 2003/0122773 A1 | 7/2003 | Washio et al. |
| 2003/0137215 A1 | 7/2003 | Cabuz |
| 2003/0137521 A1 | 7/2003 | Zehner et al. |
| 2004/0021658 A1 | 2/2004 | Chen |
| 2004/0026757 A1 | 2/2004 | Crane et al. |
| 2004/0136596 A1 | 7/2004 | Oneda et al. |
| 2004/0145553 A1 | 7/2004 | Sala et al. |
| 2005/0024301 A1 | 2/2005 | Funston |
| 2006/0057754 A1 | 3/2006 | Cummings |
| 2006/0066559 A1 | 3/2006 | Chui et al. |
| 2006/0066560 A1 | 3/2006 | Gally et al. |
| 2006/0066561 A1 | 3/2006 | Chui et al. |
| 2006/0066594 A1 | 3/2006 | Tyger |
| 2006/0066597 A1 | 3/2006 | Sampsell |
| 2006/0066935 A1 | 3/2006 | Cummings et al. |
| 2006/0077505 A1 | 4/2006 | Chui et al. |
| 2006/0250335 A1 | 11/2006 | Stewart et al. |
| 2006/0250350 A1 | 11/2006 | Kothari et al. |
| 2007/0038693 A1* | 2/2007 | Jacobi et al. .............. 708/446 |
| 2007/0126673 A1 | 6/2007 | Djordjev et al. |
| 2007/0147688 A1 | 6/2007 | Mithran |
| 2007/0182707 A1 | 8/2007 | Kothari |
| 2007/0188814 A1* | 8/2007 | Walton et al. .............. 358/3.23 |
| 2007/0247419 A1 | 10/2007 | Sampsell et al. |
| 2009/0219309 A1 | 9/2009 | Sampsell |
| 2009/0219600 A1 | 9/2009 | Gally et al. |
| 2009/0225069 A1 | 9/2009 | Sampsell |
| 2009/0273596 A1 | 11/2009 | Cummings |
| 2010/0026680 A1 | 2/2010 | Chui et al. |

FOREIGN PATENT DOCUMENTS

| | | |
|---|---|---|
| EP | 0 300 754 | 1/1989 |
| EP | 0 911 794 | 4/1999 |
| EP | 1 134 721 | 9/2001 |
| EP | 1 239 448 | 9/2002 |
| EP | 1 280 129 | 1/2003 |
| EP | 1 414 011 | 4/2004 |
| GB | 2 297 878 | 8/1996 |
| GB | 2297878 * | 8/1996 |
| JP | 2000-075963 | 4/2000 |
| WO | WO 02/089103 | 11/2002 |
| WO | WO 03/007049 A1 | 1/2003 |
| WO | WO 03/079323 | 9/2003 |
| WO | WO 04/026757 | 4/2004 |
| WO | WO 2004/054088 | 6/2004 |

OTHER PUBLICATIONS

Miles et al., 5.3: Digital Paper™: Reflective displays using interferometric modulation, SID Digest, vol. XXXI, 2000 pp. 32-35.

Miles, MEMS-based interferometric modulator for display applications, Part of the SPIE Conference on Micromachined Devices and Components, vol. 3876, pp. 20-28 (1999).

Chen et al., Low peak current driving scheme for passive matrix-OLED, SID International Symposium Digest of Technical Papers, May 2003, pp. 504-507.

IPRP for PCT/US08/051581, filed Jan. 21, 2008.

ISR and WO for PCT/US08/051581, filed Jan. 21, 2008.

* cited by examiner

ARBITRARY POWER FUNCTION USING LOGARITHM LOOKUP TABLE

BACKGROUND OF THE INVENTION

1. Field of the Invention

This application relates to the field of image processing and/or data processing.

2. Description of the Related Technology

For many display devices, there is a nonlinear relationship between the brightness of a pixel as it appears on the screen, and the numerical value of that pixel. This nonlinear relationship is approximately a power function, wherein the displayed brightness is the pixel value raised to a power of a numeral referred to herein as gamma, which is typically a non-integer between 1 and 3. In various image processing applications, a process sometimes called gamma translation is performed, raising a pixel value to a defined power. In some situations, a previously performed gamma translation is reversed, which also involves raising a pixel value to a defined power. For convenience, the defined power is always referred to herein as gamma, regardless of its relationship between the image data values and the visual characteristics of the display device.

Figure 1:
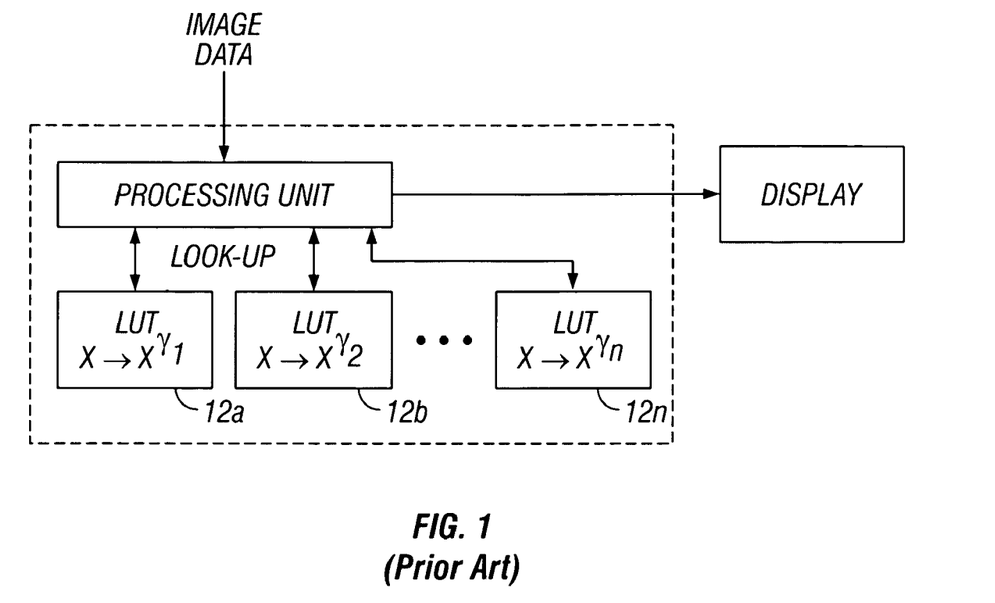
FIG. 1 illustrates a prior art display system.

Conventionally, a lookup table ("LUT") is used in these processes. The image data value, represented by an appropriately sized binary number, is used as an index pointing to a table entry where the translated representation resides. A LUT is associated with a particular defined power. If several defined powers are needed, then several LUTs $12a$-$12n$, each associated with one defined power, are required as illustrated in FIG. 1. This approach requires allocating substantial system resources for LUTs, especially when the number of gammas is large. For example, each LUT may need to be stored in expensive one-time programmable memory. Further, such an approach can only work with a limited number of defined powers for which a corresponding LUT is established. To support a new defined power, the system has to be revised to incorporate a new LUT.

Iterative algorithms based on Newton's method may also be used to compute a number to any defined power using only arithmetic operations. However, these methods require a relatively large number of calculations, and require time and processing power that is also expensive to provide for small displays such as mobile phones and the like.

Another way to raise a number to any defined power is to use piecewise linear approximations, which combine smaller LUTs with arithmetic operations. However, this approach achieves greater accuracy at the expense of increasing the number of arithmetic operations.

Therefore, it is desirable to develop a method and system of raising an image data value to a power that uses a fixed, and preferably small number of LUTs and that works with any defined data and power value. Such a method and system may be equally applied to a variety of applications to raise a number to a power of any real number.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other devices.

In one embodiment, the invention includes an image-processing device having a lookup table and a processing circuit configured to provide both forward lookups and reverse lookups during a gamma translation process. In another embodiment, an image display device includes a stored gamma value, a forward logarithm lookup table, and an inverse logarithm lookup table.

In another embodiment, a method according to the invention includes obtaining a numerical representation of a color intensity level, looking up a logarithm value associated with at least one element of the numerical representation of a color intensity level in a lookup table. The method continues with storing a result of the looking up and multiplying the result of looking up by a fractional portion of a gamma translation value and storing the result as an exponent value. The lookup table is used in reverse to obtain the inverse logarithm of the exponent value, and the inverse logarithm of the exponent value is multiplied by the element of the numerical representation of a color intensity level raised to a power defined by an integer portion of the gamma translation value.

Another method includes storing a color value in a computer-readable memory, storing a desired gamma translation value in a computer-readable memory; separating the gamma translation value into a non-integer part and an integer part, looking up the logarithm of the color value and storing the logarithm of the color value as a forward log value, multiplying the non-integer part by the forward log value and storing a result of the multiplying as an exponent value, determining the inverse logarithm of the exponent value and storing the inverse logarithm of the exponent value as an inverse logarithm result, raising the color value to a power defined by the integer part and storing a result of the raising as a raising result, and multiplying the inverse logarithm result and the raising result to produce a transformed color value.

Yet another method includes multiplying a fractional portion of a gamma value by the logarithm of a color value to obtain an exponent value, finding the inverse logarithm of the exponent value, and obtaining a gamma-transformed color value using the inverse logarithm.

In another embodiment, a processing device comprises a lookup table and a processing circuit configured to provide both forward lookups and reverse lookups during a process of calculating a non-integer power of a number.

DETAILED DESCRIPTION OF CERTAIN EMBODIMENTS OF THE INVENTION

The following detailed description is directed to certain specific embodiments of the invention. However, the invention can be embodied in a multitude of different ways. In this description, reference is made to the drawings wherein like parts are designated with like numerals throughout.

Certain embodiments which will be described below raise a number to a power using a fixed number of lookup tables. In one embodiment, only one log lookup table is used. The LUT may be used for both forward lookups and reverse lookups. These embodiments may work with any power, either integer or non-integer. In the following discussion, these embodiments are illustrated in image processing applications to raise an image data value to any power (e.g., a gamma or a desired gamma translation value) during gamma translation. However, it should be noted that these embodiments may be used in various other applications which require raising a number to any power, and are not intended to be limited to gamma translation or image processing.

As used herein, a "gamma translation process" is a process in which a numerical representation of image data is raised to a defined power. The defined power will typically be related to the gamma value well known to those in the art, and this is why it is termed herein a gamma translation process. However, depending on the display type, image data source, and other variables, the defined power need not be related to any specific or currently known image processing parameter.

The inventions described herein take advantage of the fact that finding x raised to the power y is equivalent to finding e raised to the power y·ln(x), as illustrated below.

$$x^y = e^{y \cdot \ln(x)} \qquad \text{Equation 1}$$

In the method below, a look up table is used to find ln(x) from x, and this result is multiplied by the defined power y to form the value z=y·ln(x). Then, either the same look up table or a second look up table is used to find $e^z$. The result is the value for $x^y$, which can therefore be found for any x and any y with only one or two look up tables.

This is in contrast with prior art methods that would require a different look up table for each desired value of y. It will be appreciated that the base of the log and exponentiation functions are arbitrary, and the formula above is applicable for base 2, 10, e, or any other value, as long as the logarithm function and exponentiation function are performed with the same base.

Certain embodiments reduce the size of the one or more look up tables by separating the defined power, represented by γ, into an integer portion γ_i and a fractional portion γ_f.

$$\gamma = \gamma\_i + \gamma\_f \qquad \text{Equation 2}$$

The process described above is used to calculate $x^{\gamma\_f}$, which is then multiplied by $x^{\gamma\_i}$ to get the value for $x^\gamma$. The value for $x^{\gamma\_i}$ can be easily calculated by multiplying x an integer number γ_i times.

$$x^{\gamma\_f} = e^{\gamma\_f \cdot \ln(x)} \qquad \text{Equation 3}$$

$$x^\gamma = x^{\gamma\_i} x^{\gamma\_f} \qquad \text{Equation 4}$$

Because the process now only needs to raise any number x to a power ranging between 0 and 1, the size of the lookup table(s) is decreased.

Figure 2:
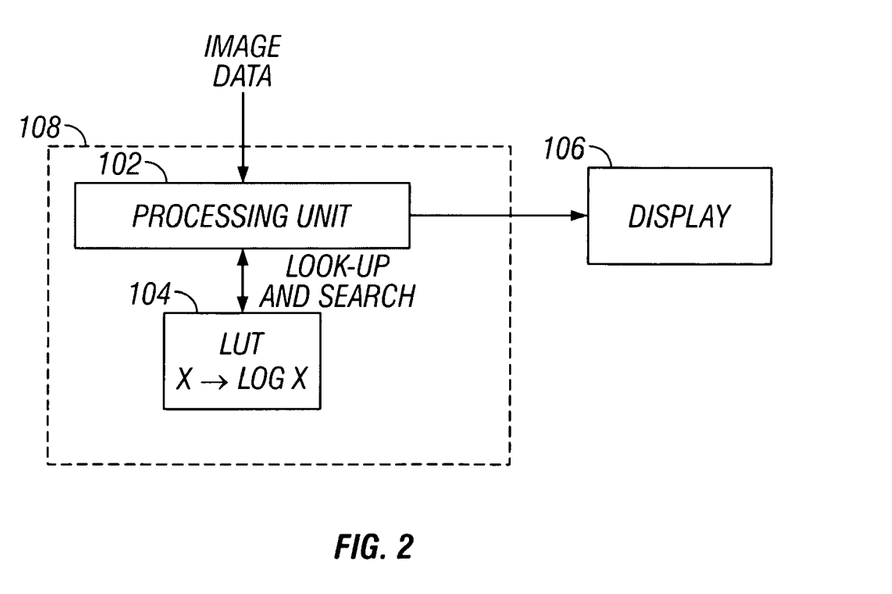
FIG. 2 is a block diagram illustrating a display system in accordance with one embodiment of the invention.

FIG. 2 is an overview illustrating one embodiment of a display system. The display system 100 includes a display 106 and an image processing unit 108. The display 106 may be any device that is configured to display an image, whether in motion (e.g., video) or stationary (e.g., still image), and whether textual or pictorial. The display 106 may be, but not limited to, an LCD, a CRT, or an interferometric modulator display. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry).

The image processing unit 108 is configured at least in part to process image data and then feed the processed image data to the display device 106. The image data may include a numerical representation of an image or a portion of an image. In one embodiment, the image data may include a numerical representation of a color value (also referred to as "pixel value"), which indicates the intensity level of one color channel of one fundamental element of the image (e.g. the brightness of a pixel of a specific color). The color value may comprise a RBG value or a portion thereof, a CMYK value or a portion thereof, a grayscale value or a portion thereof, or any other numerical representation of a color or grayscale value in whole or in part.

In the exemplary embodiment, the image processing device 108 may include a processing unit 102 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processing unit 102 may be configured to execute one or more software modules.

In one embodiment, the image processing device 108 may further include a look up table (LUT) 104 with which the processing unit 102 is configured to communicate. A LUT is a data structure, usually an array or associative array, which is associated with a function. Each array element is a function of an index pointing to that element. The array is usually used to replace a runtime computation with a simpler lookup operation. The speed gain can be significant, since retrieving a value from memory is often faster than performing an extended series of arithmetic computations. The LUT 104 may be hardwired, programmable, or both. In one embodiment, the LUT 104 is a logarithm lookup table in which each entry is a log function of a number related to the index.

The processing unit may be configured to look up from the LUT, returning values from given indices, and also to search within the LUT 104, returning indices that contain values closest to given values. In the look up operation, the processing unit accesses a memory location of the LUT 104 corresponding to a number x and retrieves the value stored at that location. In search operation, the processing unit searches the memory locations of the LUT 104 for a target value and returns the index pointing to the location in which a value closest to the target value is stored.

In one embodiment, interpolation instead of simply finding the value closest to the target value may be used in the search operation. The target value may be, for example, 0.25. Right below 0.25 there may be a value of 0.2 stored at an index of 3. Right above 0.25 there may be a value of 0.4 stored at an index of 4. One choice as described above is to return an index of 3 because the index 3 points to a value 0.2 which is the closest value to the target value of 0.25. But more accuracy may be achieved if interpolation between 0.2 and 0.4 is used. Depending on the desired accuracy level, different types of interpolation may be used. In another embodiment, the search operation may be configured to return a function of the index retrieved, instead of the index itself. For example, the returned value may be the index retrieved plus an offset that depends on the difference between the ideal value and the value found in the table. This may improve the accuracy of the search operation.

As described above, raising a data value to a power using the method outlined above requires performing both a logarithm computation and an exponentiation computation. The look up and search procedures on the single LUT 104 provide these functions in the embodiment of FIG. 2.

Figure 3:
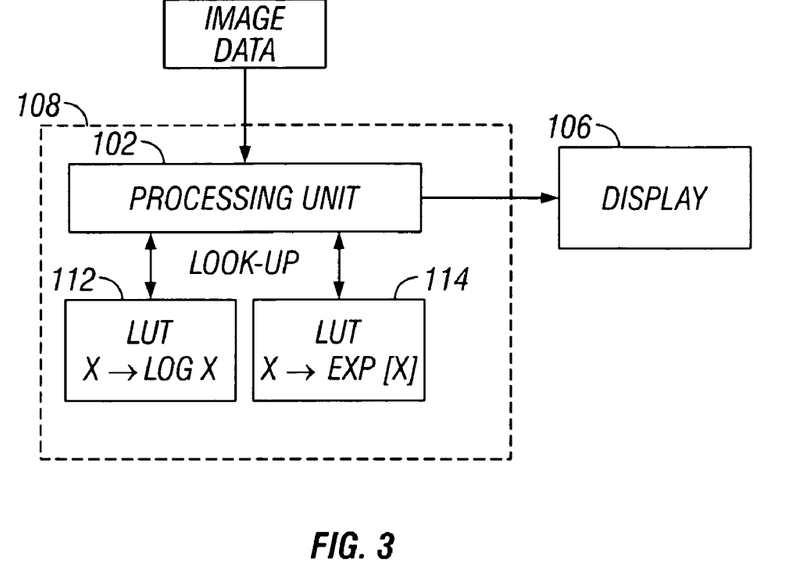
FIG. 3 is a block diagram illustrating a display system in accordance with another embodiment of the invention.

FIG. 3 is a diagram illustrating another embodiment of a display system. Rather than using one LUT 104, this embodiment includes two LUTs 112 and 114. The LUT 112 is similar to the LUT 104 in FIG. 2. The LUT 114 is an inverse logarithm look up table wherein each table entry is the exponentiation of the associated index. The processing unit is configured to perform look up operations using both the LUTs 112 and 114. Though this embodiment requires one more LUT, it may save time by replacing the search operation with a simpler look up operation. In one embodiment, the LUT 114 may have fractional indices that are returned during the search operation instead of just the integer indices. During the lookup, the integer index matching the data is used to retrieve the desired log value. When searching, more values to search through are provided, where the additional values searched store log values for fractional inputs such as log values for fractional indices between integer indices 42 and 43

Figure 4:
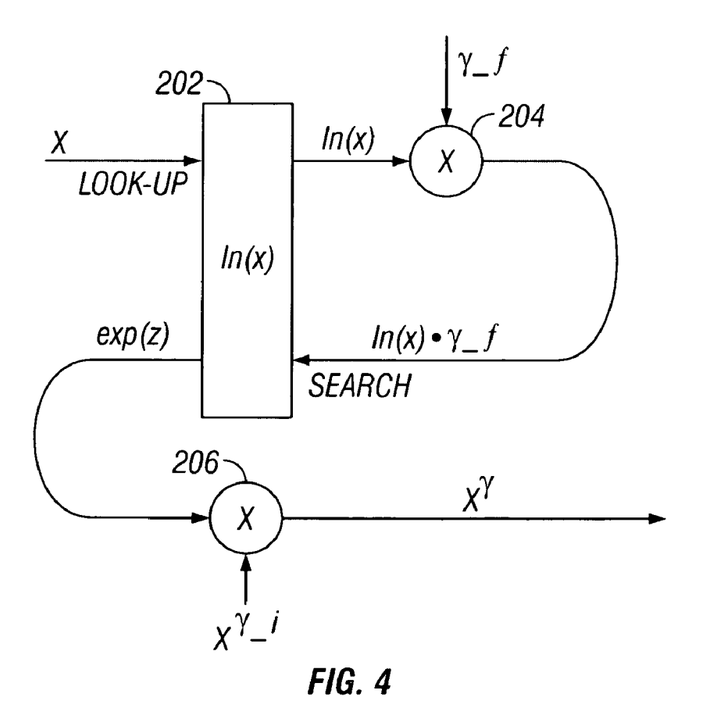
FIG. 4 illustrates one exemplary flow to raise an image data value to a defined power.

FIG. 4 illustrates one exemplary flow to raise a data value to a defined power. The data value and the defined power are represented by x and y respectively. In FIG. 4, a natural logarithm look up table 202 is first used to compute the natural logarithm ln(x) of an image data value x. In this process, x is used as an index to look up the LUT 202 and the table entry to which the index x points to is ln(x). This process uses the LUT in a traditional manner and may be referred to as forward look-up. The ln(x) is then multiplied by a fractional portion of the defined power, $\gamma\_f$, using a multiplier 204. The product is represented by $z=\gamma\_f \cdot \ln(x)$.

The next step is to calculate the exponent of z, which is represented by $e^z$. In the exemplary embodiment, a search algorithm is employed to find one entry of the LUT 202 which most closely matches z. The index associated with that table entry is $e^z$. This process uses the LUT 202 in a manner different from the traditional manner and may be referred to as a reverse look-up. The search algorithm may be any suitable search algorithm such as various list search algorithms. The result of the search is x raised to the power $\gamma\_f$.

For example, we might have 6-bit image data comprising values from 1 to 64 and representing a gray scale intensity between 0 (black) and 1 (white) in 64 increments. For this embodiment, a LUT may store at 64 memory locations ln(1/64), ln(2/64), etc. up to ln(1). The power being used may, for example, be 1.8. If the image data for a given pixel is 42, representing a brightness of 42/64, the processor would access memory location 42, retrieving the value of ln(42/64), which is −0.422. This value is multiplied by 0.8, the fractional portion of the power, resulting in a z value of −0.338. The memory locations of the LUT are then searched for this value. The closest value stored in the LUT to the value −0.338 is −0.332, which is stored in memory location 46, since ln(46/64)=−0.332. The reverse search process thus returns the index 46. Because the integer part of the power is one, the original value of 42/64 ($x^1$) is multiplied by 46/64 ($x^{0.8}$), and the result is 0.472 ($x^{1.8}$). This is closest to 30/64, thus converting the original 6-bit pixel value of 42 to a new 6-bit pixel value of 30. This may be compared to a direct calculation of $(42/64)^{1.8}$, which is 0.4685, while 30/64 is 0.468.

If the power were 2.2 instead, the resulting z value would be −0.0844 because the fractional part of the power is 0.2 instead of 0.8. In this case, the search process would return the index 59 where the value −0.0820 is stored. Because the integer portion of the power is 2, multiplication of $(42/64)^2$ times (59/64) would be performed, resulting in a value of 0.397. This is closest to 26/64, converting the pixel value of 42 into a pixel value of 26. This may be compared to a direct calculation of $(42/64)^{2.2}$ which is 0.396, while 26/64 is 0.406.

It can therefore be appreciated that a single LUT can be used to raise any value x to any power y with this process, thus avoiding multiple and inflexible LUTs or computationally complex iterative methods.

It will be appreciated that the exponentiation function may be calculated in other ways. In the embodiment illustrated in FIGS. 3 and 5, a second inverse logarithm (exponentiation) look up table is included. While the LUT 202 includes entries which are the natural logarithm of the associated index, the inverse LUT include entries each of which is the value for e raised to the associated index. The value for z is used as an index to look up the inverse logarithm in the second LUT and the table entry to which the index z points to stores the value for $e^z$. Though this example requires one more LUT, it may save time by replacing the searching operation with a simpler look up operation.

The resulting retrieved value for $e^z$, which is equal to $x^{\gamma\_f}$ as indicated by Equation 3, is then multiplied by $x^{\gamma\_i}$ using a multiplier 206. In some embodiments, there is only one multiplier which functions as both multipliers 204 and 206. The product is thus equal to $x^\gamma$. The value for $x^{\gamma\_i}$ may be calculated using a multiplier (not shown in the figure). For example, if $\gamma\_i$ is 3, x may be raised to the power of 3 by multiplying x with itself three times.

Figure 5:
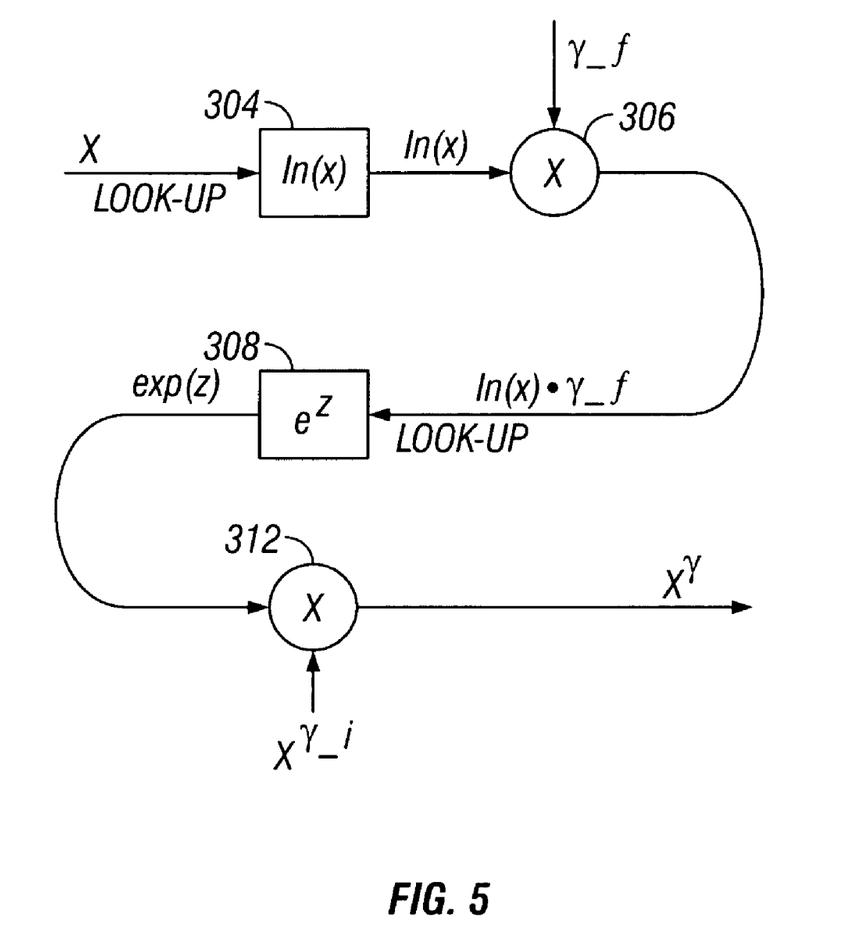
FIG. 5 is a functional block diagram illustrating one embodiment of a system configured to raise an image data value to a defined power.

FIG. 5 is a functional block diagram illustrating one embodiment of a system configured to raise an image data value to any power. The system includes a logarithm look up table 304, which may be similar to the LUT 202 (see FIG. 4). The index of the LUT 304 may be, for example, represented by an appropriately sized binary number.

In one embodiment, the system further includes an inverse logarithm LUT 308 wherein each entry is the exponentiation of the corresponding index, as described earlier with regard to FIG. 3. The system is configured to look up the LUT 308 using $z=\gamma\_f \cdot \ln(x)$ as input and get the exponent of $z=\gamma\_f \cdot \ln(x)$, which is equal to $x^{\gamma\_f}$.

The system may further include two multipliers 306 and 312. The multiplier 306 is configured to multiply $\gamma\_f$ by ln(x). The multiplier 312 is configured to multiply $x^{\gamma\_i}$ by $x^{\gamma\_f}$. The output of the multiplier 312 is then $x^\gamma$. In some embodiments, one multiplier is configured to function as both multipliers 306 and 312.

Figure 6:
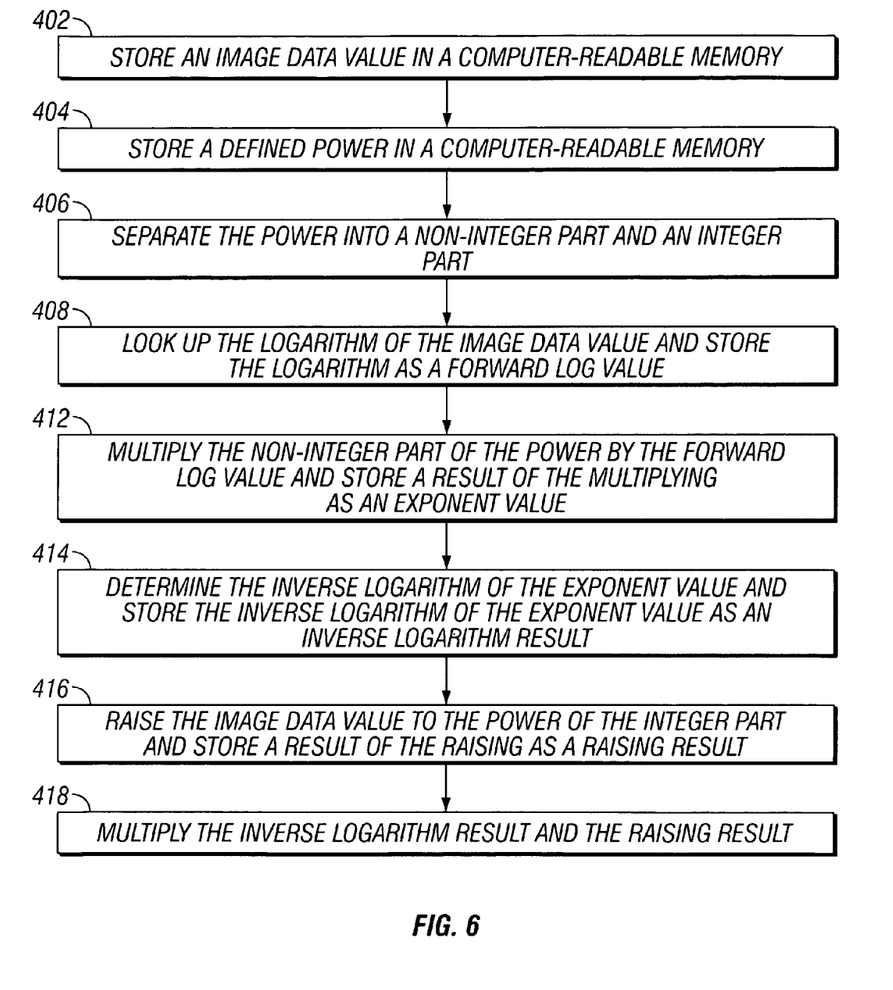
FIG. 6 is a flowchart of one embodiment of a method of raising an image data value to a defined power.

FIG. 6 is a flowchart of one embodiment of a method of raising a data value to any power. Depending on the embodiment, certain steps of the method may be removed, merged together, or rearranged in order. The general principle of the exemplary method will be described first as below.

The method begins at a block 402, where the image data value x is stored in a computer-readable memory. Next at a block 404, a defined power is stored in a computer-readable memory. Moving to a block 406, the defined power is separated into an integer part and a non-integer part. Next at a block 408, the logarithm of the image data value is looked up and stored as a forward log value. As described with regard to FIG. 4, the logarithm is obtained by forward looking up a logarithm LUT using the image data value as an index. Moving to a block 412, the forward log value is multiplied by the non-integer part of the defined power. The result is then stored as an exponent value.

Next at a block 414, the inverse logarithm of the exponent value obtained in block 412 is determined and the result is stored as the inverse logarithm result. In one embodiment, the inverse logarithm of the exponent value is obtained by reverse looking up a logarithm LUT. Alternatively, it may be obtained by forward looking up an inverse logarithm LUT using the exponent value as an index.

Moving to a block 416, the image data value is raised to the integer part of the defined power. The result is stored as a raising result. The operation of raising can be performed by multiplying 1 by the image data value multiple times.

Lastly at a block 418, the inverse logarithm result is multiplied by the raising result. The product of multiplying is the image data value raised to the defined power.

The embodiments discussed herein teach separating the defined power into an integer part and a fractional part. This separation is beneficial because it dramatically decreases the size of the lookup table or lookup tables. The image data value can be trivially raised to any integer by repeated multiplication which does not create much of a computational burden. In other embodiments, it is possible not to separate the defined power into two parts. In that case, the entire defined power is treated as the fractional part is in the above discussion, and the integer part of the exponent value is set to zero.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An image-processing device comprising:
    a storage element storing data comprising a lookup table, the lookup table comprising a set of indices and logarithm data related to each index; and
    a processing circuit for performing a gamma translation process, wherein the processing circuit is configured to retrieve, from the lookup table, logarithm data based on a provided index and to retrieve an index, from the lookup table, based on a provided logarithm data,
    wherein the processing circuit is configured to:
        (a) determine the logarithm of a numerical color value by retrieving logarithm data from the lookup table using the color value as the index;
        (b) multiply the logarithm of the color value by a fractional portion of a gamma value, thus generating a first value; and
        (c) determine the inverse logarithm of the first value by searching the lookup table for logarithm data close to the first value and returning the index linking to the logarithm data as the inverse logarithm of the first value.

2. The image-processing device of claim 1 wherein said processing circuit is configured to translate a value with respect to a non-integer gamma.

3. The image-processing device of claim 1 further comprising a multiplier.

4. The image-processing device of claim 1 further comprising a gamma-adjustment user interface.

5. The image-processing device of claim 1 wherein said processing circuit is configured to search the lookup table for logarithm data close to a provided logarithm data and to return the index linking to the logarithm data.

6. An apparatus comprising:
    a display;
    means for storing a non-integer gamma value; and
    means for raising a numerical color value to a power of said non-integer gamma value, said raising means comprising:
        means for retrieving logarithm data from a lookup table based on a provided index, the lookup table comprising a set of indices and logarithm data related to each index; and
        means for retrieving from the lookup table an index based on a provided logarithm data,
    wherein the non-integer gamma value includes an integer portion and a fractional portion, wherein the raising means further comprises:
        (a) means for determining the logarithm of the numerical color value by retrieving logarithm data from the lookup table using the numerical color value as the index;
        (b) means for multiplying the logarithm of the numerical color value by the fractional portion of the non-integer gamme value, thus generating a first value; and
        (c) means for determining the inverse logarithm of the first value by searching the lookup table for logarithm data close to the first value and returning the index linking to the logarithm data as the inverse logarithm of the first value.

7. A processing device comprising:
    a storage element for storing data comprising a lookup table, the lookup table comprising a set of indices and logarithm data relate to each index; and
    a processing circuit for raising a base value D to a power of a non-integer power value P, the processing circuit is configured to retrieve, from the lookup table, logarithm data based on a provided index and an index based on a provided logarithm data,
    wherein the non-integer power P includes an integer portion and a fractional portion, wherein the processing circuit is configured to:
        (a) determine the logarithm of the base value D by retrieving logarithm data from the lookup table using the base value as the index;
        (b) multiply the logarithm of the base value by the fractional portion of the non-integer power P, thus generating a first value; and
        (c) determine the inverse logarithm of the first value by searching the lookup table for logarithm data close to the first value and returning the index linking to the logarithm data as the inverse logarithm of the first value.

8. The device of claim 7, wherein the processing circuit is further configured to:
    (d) raise the base value D to a power defined by the integer portion of the non-integer power P and storing the result of said raising as a second value; and
    (e) multiply the second value by said inverse logarithm of the first value to produce a third value, the third value being the result of raising the base value D to a power of the power value P.

9. The device of claim 1, wherein the processing circuit is configured to translate a color value with regard to a non-integer gamma value.

10. The device of claim 1, further comprising circuitry configured to transform image data with respect to a gamma value and to display a transformed image.

11. The device of claim 1, further comprising a monitor.

12. The device of claim 1, further comprising a video card.

13. The device of claim 1, wherein said numerical color value represents a color intensity level.

14. The device of claim 1, wherein the color value is an RGB value.

15. The device of claim 1, wherein the color value is an CMYK value.

16. The device of claim 1, wherein said gamma translation value is a positive non-integer.

17. The device of claim 1, wherein said lookup table is a natural logarithm lookup table.

18. The apparatus of claim 6, wherein the raising means further comprises:
   (d) means for raising the numerical color value to a power defined by the integer portion of the non-integer gamma value and storing the result of said raising as a second value; and
   (e) means for multiplying the second value by said inverse logarithm of the first value to produce a third value, the third value being the result of raising the numerical color value to a power of the non-integer gamma value.

19. The apparatus of claim 6, wherein the raising means comprises at least one computing device.

\* \* \* \* \*